United States Patent
Paatzsch

[15] 3,681,995
[45] Aug. 8, 1972

[54] DEVICES FOR THE TRANSFER OF SAMPLE LIQUID

[72] Inventor: Peter Paatzsch, Kneippweg 1a, 777 Uberlingen, Germany

[22] Filed: June 8, 1970

[21] Appl. No.: 44,267

[30] Foreign Application Priority Data
June 9, 1969 Germany..........P 19 29 169.1

[52] U.S. Cl. ................................73/421 B, 356/246
[51] Int. Cl. ..............................................G01n 1/14
[58] Field of Search ...........73/423 A, 421 B; 23/253; 356/246

[56] References Cited
UNITED STATES PATENTS

| | | | |
|---|---|---|---|
| 3,225,601 | 12/1965 | Shrewsbury | 356/246 |
| 3,478,598 | 11/1969 | Nielson | 73/423 A |
| 3,489,525 | 1/1970 | Natelson | 356/246 |

*Primary Examiner*—S. Clement Swisher
*Attorney*—Edward R. Hyde, Jr.

[57] ABSTRACT

In an automated testing apparatus of the type in which a series individual liquid samples in separate sample vessels are transferred into individual sample cells, a positive displacement pump is utilized for this transfer, rather than temporary utilization of a large vacuum source. Use of such a pump avoids frothing and the consequent formation of bubbles (which may lead to errors in photometric measurements of the samples in the cells). Additionally a plurality of liquid samples may be transferred by utilizing a single multi-channel positive displacement pump (e.g., of the hose type) even though the samples have substantially different viscosity. A conventional large vacuum source is preferably still used to empty the sample cells after testing, to insure complete evacuation of the sample material from the cells and the hoses.

10 Claims, 8 Drawing Figures

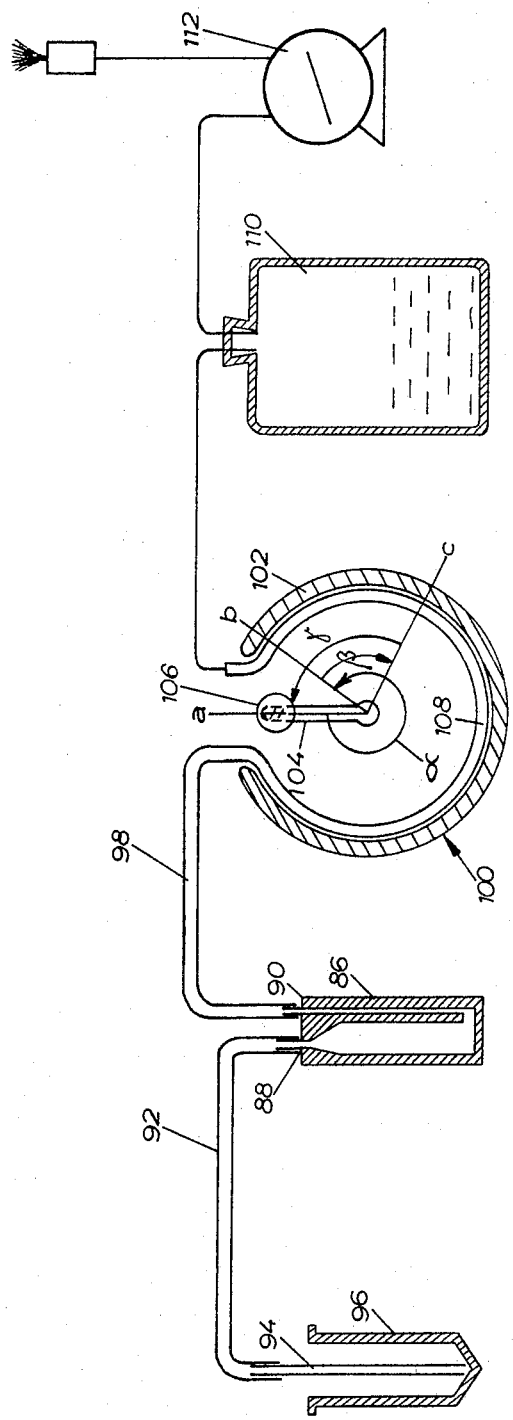

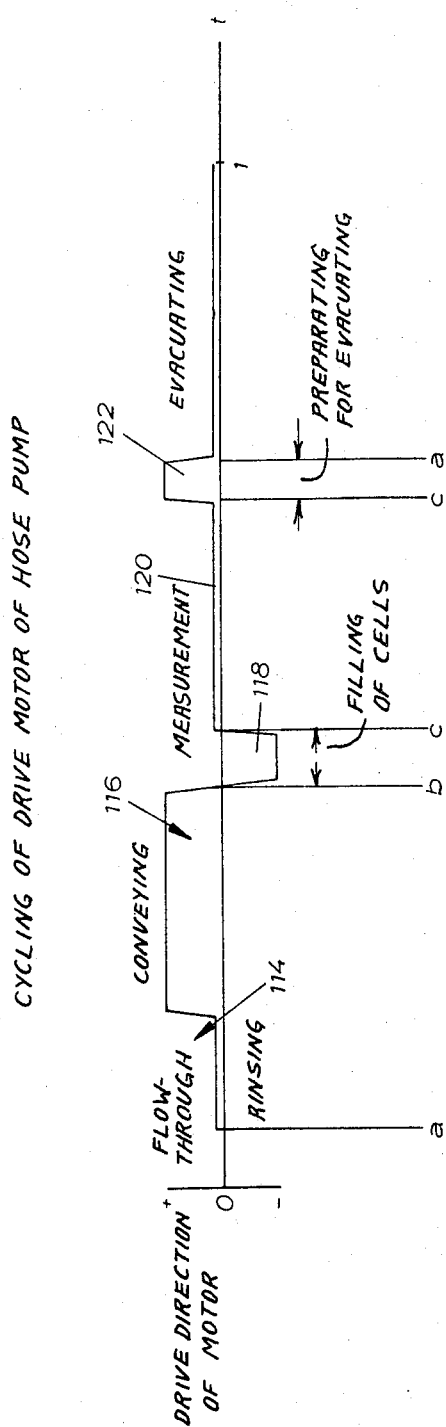

DEVICES FOR THE TRANSFER OF SAMPLE LIQUID

The present invention relates to automated testing apparatus of the type in which a series of individual fluid samples from separate sample vessels are transformed into individual sample cells which may be conveyed (as by being carried by a circular turntable) to a test or analyzing device, typically of a photometric (i.e., optical measuring) type. In particular, the present invention concerns a device for such transferring liquid samples from the original sample vessels into the cells and later for sucking the sample liquid out of the cells, which device is of the type including a first connecting line from the sample vessel terminating as a connection at the upper portion of the sample cell, and a second connection leading from the bottom of the sample cell to a vacuum source, and a shutoff in the connecting line between the second cell connection and the vacuum source.

In a prior art arrangement of this type there is provided a suction pipe which can be lowered to reach down to the bottom of the original sample vessel or container, as well as a sealed sample cell having three connections two of which are terminating at the top and one at the bottom of the cell. A final waste container is held under high vacuum by a vacuum pump. A further connecting line is provided between the suction pipe (from the vacuum source) and a first connection terminating at the top of the cell. By means of a valve the vacuum source is alternatingly connectable to the second connection terminating at the bottom of the cell or to the third connection terminating at the top of the cell. It is prior art to design the valve as a three-way cock (German Utility Model 1,936,731).

In another prior art arrangement (German Utility Model 1,984,797) the communication of the inlet of the second container with the second (lower) and third (upper) cell connections is effected through a branch hose. The two ends (on the cell side) of this hose are carried from the branch point along a pivotable lever and then after deflection along two walls arranged on opposite sides of the said lever such that depending on the position to which the lever is pivoted, it alternatingly bends the one or the other end of the hose in V-shaped manner to close this branch connection.

Thus, in all such prior arrangements, the sealed sample cell is connected directly to the vacuum source to create a great pressure drop to cause the medium to be transferred to be sucked into the cell. After measurement the sample liquid is sucked out of the cell, and the next following sample can be similarly transferred into the cell. The problem encountered with this type of transfer resides in the pressure drop or suction conditions: ideally for the transfer, the pressure differential should be just great enough to cause the sample liquid to be sucked into the sample cell through the transfer hose. The pressure dip should not be too great in order to avoid a substantial formation of bubbles which are unfortunately encountered with liquids of low surface tension. Due to the scattering of light such a formation of bubbles leads to errors in the photometric measurement of the sample in the cell at the testing station. After the sample has been measured, it is removed from the sample cell by suction. When sucking off the sample, the pressure differential (depression) should be as great as possible to completely removed this already analyzed sample, so that the next following sample will not be contaminated by any substantial residue of the sample just measured which would, of course, cause errors in the test results of such next sample.

It is also difficult to transfer several samples (from one set of containers to a set of cells) along parallel lines at the same time. If two or more samples which may be specifically different in consistancy (e.g., viscosity, etc.), are to be transferred at the same time with such prior arrangements, in which transfer is effected by one and the same vacuum to which all transfer channels are connected, it is not possible to maintain a single optimum pressure drop for all sample transfers. In these prior arrangements, a reduced pressure transfer cannot yield optimum conditions for such different samples. If the pressure drop is too small, highly viscous sample liquids may not be transferred at all and that contamination of the next sample with the previous (highly viscous) one is inadmissibly great. If the pressure drop is too high, during transfer from the sample vessel to the sample cell, the sample liquid will pass in a turbulent flow into the cell and formation of undesirable bubbles will be inevitable. Moreover, if more than one different type of sample is transferred in parallel lines (all connected to the same, reduced pressure source) the pressure conditions become practically uncontrollable.

It is an object of the present invention to avoid the described disadvantages of the prior arrangements and to design a device of the type mentioned hereinbefore such that, on the one hand, a bubble-free transfer of the sample from the sample vessel is ensured, while on the other hand contamination of one sample by the previous one is kept at a minimum.

According to the invention this object is attained by providing that to suck the sample liquid out of the original sample vessel into the sample cell an additional transfer pump is connected to the cell, which ensures a relatively slow bubble-free transfer of the sample liquid into the cell. With such an additional transfer pump a slow bubble-free transfer of the sample from the sample vessel into the cell can be ensured because of the gradually increasing pressure drop and specific volume of reduced pressure created.

On the other hand, when the second connection of the sample cell is directly connected to the vacuum source (as by a releasable valve), a quick suction of the sample liquid from the cell at relatively high pressure drop is provided which assures low retention of the sample in the cell. The use of a positive displacement pump of the piston pump type, such as used for the just mentioned transfer is not suitable for such suction and blowout of the hoses for complete evacuation of the sample material after it has been tested.

If several samples are transferred from original vessels to sample cells at the same time, the pressure drop in the connecting line will adjust automatically according to the viscosity of the sample such that a transfer of the sample in a bubble-free manner is accomplished if each parallel connecting line is effectively subjected to its own isolated pressure drop and valume. By way of example, provision can be made that the velocity of the sample in each connecting line does not increase beyond 100 mm/sec.

The transfer pump may advantageously be designed as a hose pump (that is, one in which a hose or tubing is constricted at a continually moving location). Such a hose pump is of relatively simple construction, will not be attacked by the sample liquid (since only the hose is contacted thereby) and permits a slow transfer in several independent parallel channels (hoses, tubes or lines) at the same time if a corresponding number of hoses are arranged side by side.

The positive displacement (e.g., hose) may be communicated with a third connection to the sample cell, terminating in the upper portion of the cell. The output side of the hose transfer pump can be connected to the vacuum source in parallel with the direct (second) connection from the bottom of the sample cell to the vacuum source (through a releasable valve). The hose pump may be in the form of a hollow cylinder along the interior surface of which is trained the hose from the third cell connection, and a motor driven rotor comprising two mutually offset (say, by 180°) compression bodies or lobes compresses the hose against the internal cylinder wall and the compression bodies; a cam disk synchronously revolves with the rotor, which cam controls a separate compression body acting as a valve for shutting off the connection between the second cell connection and the vacuum source.

A particularly simple form of the device is obtained by connecting the hose pump in series between the second connection of the cell and the vacuum source, and a conduit element of sufficient size to accommodate the cell volume is provided between the hose pump and the cell; in this form (avoiding entirely a third connection) the hose pump is controlled to perform a suction stroke in one direction and a return stroke in the opposite direction, so that during the suction stroke sample liquid is sucked from the sample vessel through the sample cell and into the said conduit element, and during the return stroke the sample liquid returns to refill the sample cell; and finally the hose pump releases the pinching of the hose entirely to open the passage from the cell directly to the vacuum source (by the pump assuming an intermediate position, not contacting the hose). With such an arrangement no separate third connection between the sample cell and vacuum source with a separate valve is required. As long as the hose pump is operating, the pump itself acts to a direct connection between the cell and vacuum source, so that feed takes place only in response to the movement of the hose pump. First, sample liquid is sucked into and immediately sucked out again of the sample cell into the said conduit element through the second connection (terminating at the bottom of the sample cell). During the return stroke of the pump, the cell is filled from the bottom from the conduit. Now, the sample measurement can be carried out. In the subsequent hose pump position (in which the hose is not compressed at any point) passage from the cell to the vacuum source is directly open, the hose pump being completely inoperative, and sample liquid is sucked out of the cell at a relatively great pressure drop (i.e., that of the vacuum source).

The hose pump may have a hollow cylindrical wall extending through slightly less than 360° in which the hose from the second cell connection is carried around internally, and a rotor including a single compression body, is moved in accordance with a control program, the hose being in general compressed between the internal cylinder wall and the compression body. First, the rotor runs in one direction for generating the suction stroke and then in the opposite direction through a smaller angle for generating the return stroke. For releasing the passage through the hose pump the rotor is movable into a position in which the compression body is disposed in the part of the angle range not including the hollow cylinder.

The first connecting conduit (between the original sample vessel and the sample cell) may first be insertable down part way into the full depth of the sample vessel for a rinsing action of the sample cell, while a direct communication between the second sample cell connection and the vacuum source is established at the same time. Then a proportion of the sample liquid defined by the depth of immersion of the connecting conduit into the sample vessel is sucked at relatively high vacuum through the system, whereby the system is so-to-speak rinsed with sample liquid. The rest of the sample liquid in the original sample vessel may then be used for the actual sample measurement without any preceding sample being undesirably present.

The vacuum source may be a sealed waste collection bottle maintained at a very low pressure by being connected to a vacuum pump.

A few exemplary embodiments of the present invention will now be described in greater detail by reference to the accompanying drawings, in which:

FIG. 7 illustrates schematically another embodiment of the invention utilizing only two connections to the sample cells; and FIG. 8 is a diagram illustrating control of the drive motor for the hose pump in the arrangement according to FIG. 7.

Figure 1:
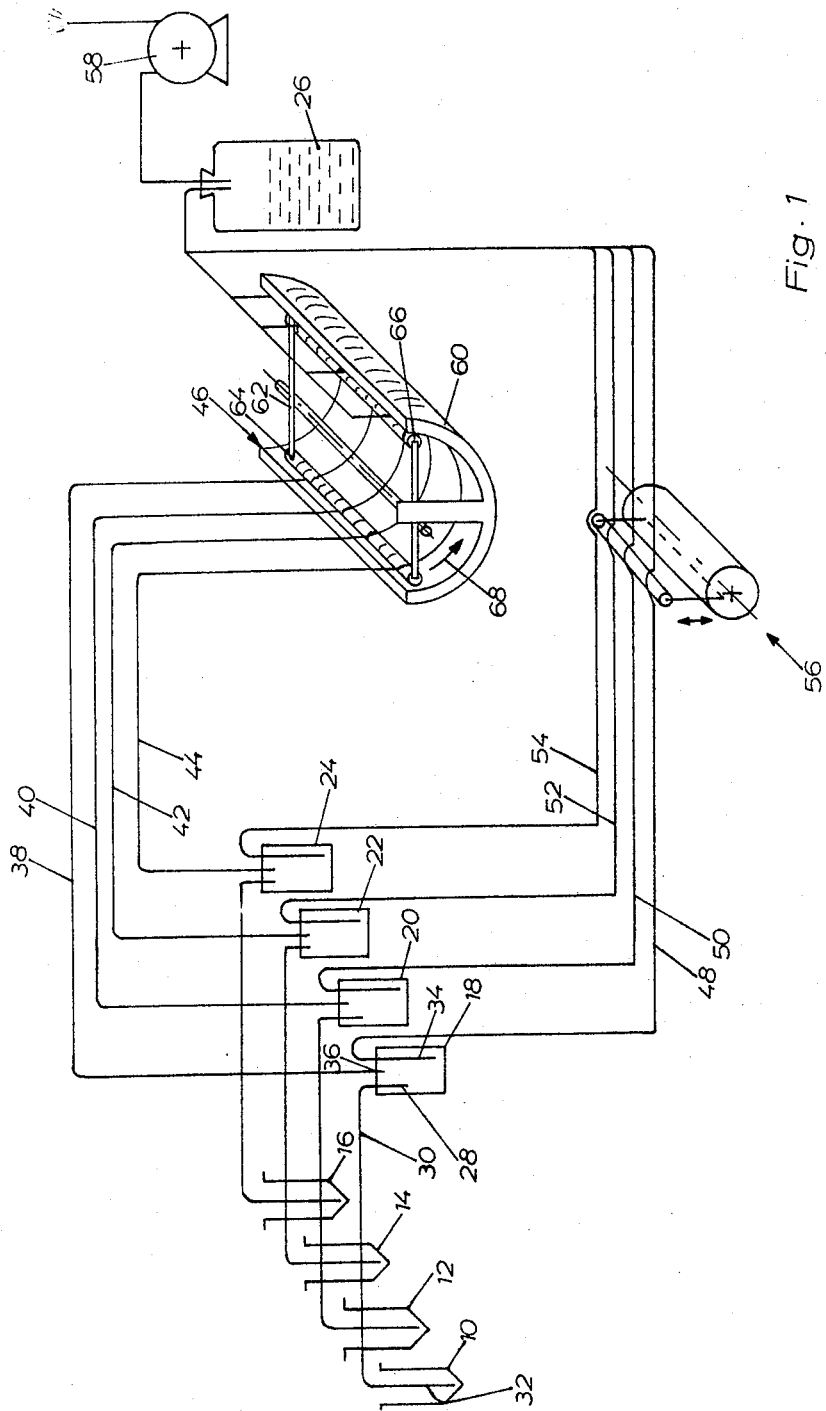
FIG. 1 is a schematic diagrammatic view of a first embodiment of a transfer device incorporating the invention.

As schematically shown in FIG. 1, it is the purpose of the arrangement according to this invention to transfer sample liquid from a series of sample vessels of which four are shown at 10, 12, 14, 16 are shown in the exemplary embodiment into, for example, four cells 18, 20, 22 and 24. These cells may be photometric test cells in which a photometric measurement of the sample liquid from the original sample vessels 10 to 16 is intended to be made. After such measurement, the sample liquid shall be sucked from the cells 18, 20, 22 and 24 into a waste collection bottle 26. Preferably no residues of the sample liquid should remain in the sample cells after this emptying takes place to avoid errors in the next following measurement which retention of the previous sample would cause. The apparatus shown may be part of an automatic analytical apparatus. By way of example, the original sample vessels 10 to 16 may be mounted on a turntable on which suitable reagents are admixed to the samples under analysis, the results of the reaction being evaluated quantitatively by photometric measurement. It may, for instance, be an apparatus such as described in the German Utility Model 1,995,285.

Each of the sample cells have a respective first connection 28 (terminating, for example, in the upper portion of the cells 18, 20, 22 and 24, respectively), to each of which a separate connecting line 30 is attached terminating in a suction pipe 32 immersed in a different respective one of the sample vessels (10-16). Each of the sample cells 18 to 24 has a second connection 36 which again terminates in the upper portion of the cell, is attached a respective hose, 38, 40, 42 or 44. The four hoses 38 to 44 enter a single positive displacement type or "hose" pump 46. The hose pump is adapted to produce simultaneous suction through all four hoses 38 to 44. The other or output ends of the hoses 38 to 44 beyond the suction pump 46 are connected to the waste or collection bottle 26. The waste bottle 26 also has connected thereto hoses 48, 50, 52 and 54 which communicate with the second connections 34 of the cells 18 to 24. These hoses 48 to 54 can be all closed together by a shut-off or "squeeze" valve 56. By means of a vacuum pump 58 a vacuum is generated in the waste bottle 26, which is sealed in air-tight manner.

The hose pump 46 contains a cylindrical cup-shaped body 60 along the internal wall of which the hoses 38 to 44 are carried along. A rotor 62 carries two compression bodies 64 and 66 mutually off-set by 180° (if the body is approximately half a cylinder as shown) by which the hoses 38 to 44 are respectively compressed against the cylindrical cup-shaped body 60. When the rotor 62 revolves, the hoses (38-44) are squeezed respectively by the compression bodies 64 or 66, the point of compression of the hoses traveling in the direction of the arrow 68 (if the rotor moves counterclockwise), and a feeding motion of the liquid is effected in a direction towards the waste bottle 26.

Figure 2:
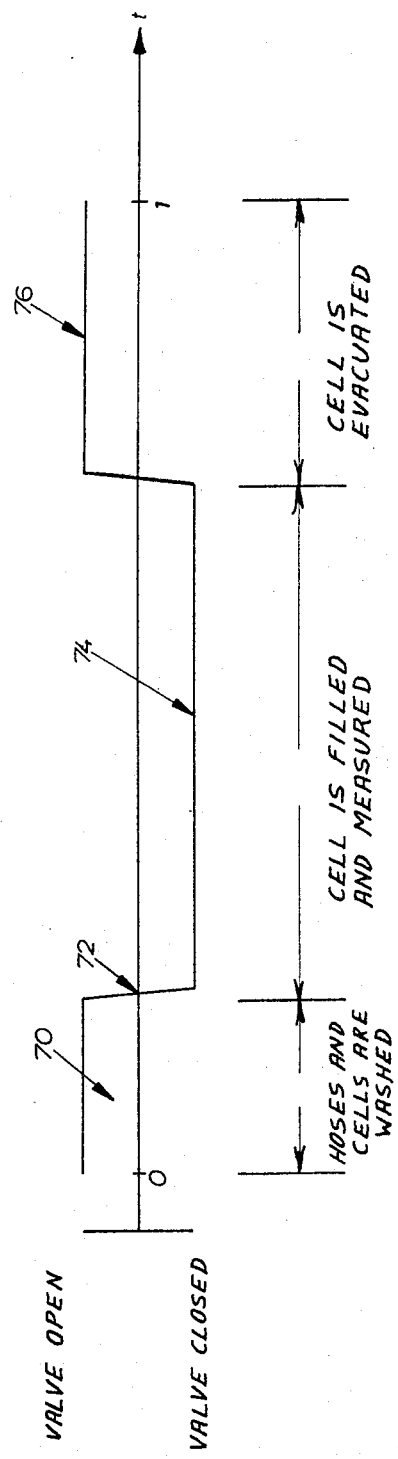
FIG. 2 is a schematic time diagram of the working cycle is a schematic time diagram of the working cycle of the cut-off valve between the sample cells and the vacuum source in the arrangement according to FIG. 1.

The FIG. 1 embodiment operates as follows. First, the suction pipes 32 are only partly immersed in the sample vessels 10 to 16, and the shut-off valve 56 opens. Due to the strong suction or pressure drop generated by the vacuum pump 58 in the waste bottle 26, the various liquid samples are sucked into the corresponding cells 18, 20, 22, 24 through the respective connecting lines 30 and from there into the waste bottle 26 through the lines 48 to 54. This sucking of sample material through the whole apparatus occurs to a depth corresponding to that down to which the suction pipes 32 are immersed in the sample vessels 10 to 16. This corresponds to the time period 70 in the diagram of FIG. 2. Thereby, the various connecting lines 30 and cells 18 to 24 are rinsed by the sample liquid prior to testing. Thereafter, the valve 56 is closed at the time illustrated in the diagrammatic point 72 in FIG. 2, and the hoses 48 to 54 establishing a direct communication between the cell and the waste bottle are shut by being squeezed tight. The suction pipes 32 are then immersed further into the sample liquid down to the bottom of the vessels 10 to 16, as illustrated in FIG. 1. The hose pump 46 is then started and, through the hoses 38 to 44, sucks off air from the cells 18 to 24 so that the sample liquid from the sample vessels 10 to 16 enters into the cells 18-24 through the connecting lines 30. This suction of the air and therefore the pressure drop in cells 18-24 takes place gradually in response to the movement of the rotor 62, so that turbulence and the concurrent formation of bubbles in the various suction pipes 32 and connecting lines 30 is avoided. The pressure drop produced in each of the cells 18 to 24 during the transfer action is dependent on the viscosity of the respective sample liquid, and transfer is effected at a substantially constant velocity of flow defined by the speed of the rotor 62. For example, if the sample liquid in vessel 12 is substantially more viscous than that in say vessel 16, then momentarily the pressure drop in sample cell 20 will tend to be greater than in sample cell 24; but this momentarily greater vacuum in cell 20 will exert a greater "pulling" force on the more viscous sample in vessel 12, thereby tending to transfer substantially the same total quantity of sample liquid to cell 20. Thus, this arrangement tends to self-adjust the pressures in each "channel" so as to cause transfer of substantially the same quantity of liquid sample from each vessel 10–16 to its corresponding sample cell 18–24. After the various cells are filled, the (photometric) measurement will be carried out. These actions occur during the time period corresponding to section 74 in the diagram of FIG. 2.

Thereafter, the shut-off or "squeeze" valve 56 is again opened. The sample liquid is sucked out of the cells via the connections 34 and the hoses 48 to 54 by the vacuum in the waste or collection bottle 26. Thus, because of the relatively strong suction provided, the remaining sample liquid is sucked off very rapidly and completely, so that no substantial amount of residue remains in the system. This action corresponds to section 76 in the diagram of FIG. 2.

Figure 3:
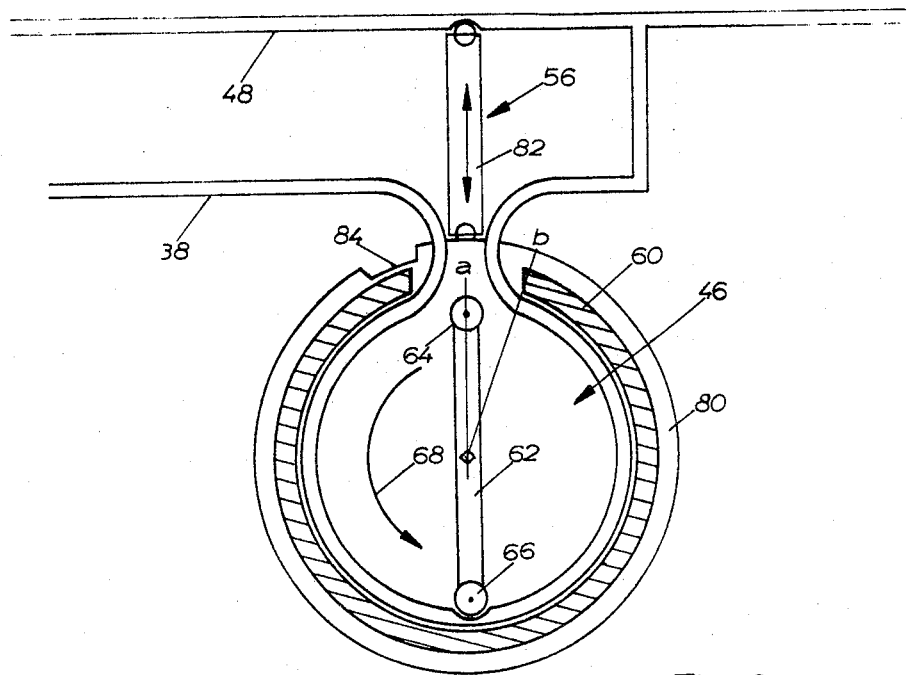
FIG. 3 illustrates schematically a particularly advantageous arrangement of one form hose pump and conjointly operated cut-off valve in central section, which may be used in the FIG. 1 embodiment.
Figure 4:
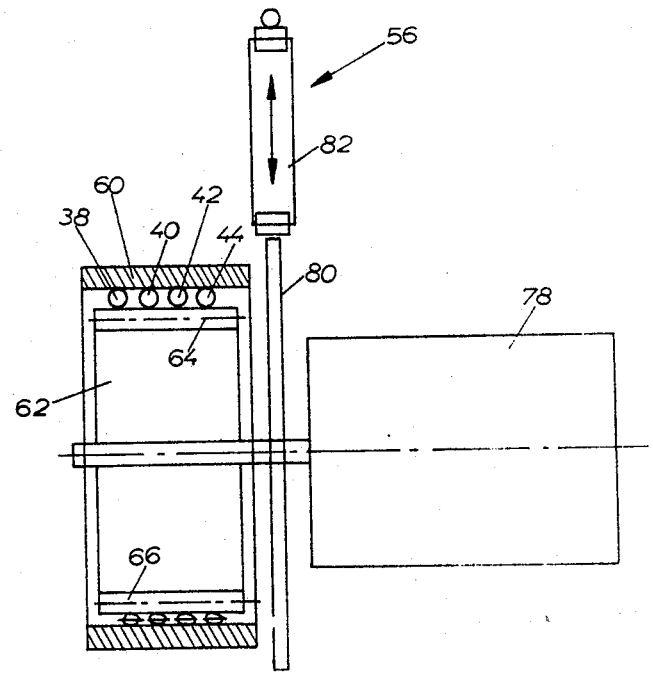
FIG. 4 is a somewhat schematic side view of the FIG. 3 elements, partly in section.

FIGS. 3 and 4 illustrate a particularly advantageous design of the hose pump 46 and of the vacuum shut-off or squeeze valve 56 that may be used in the FIG. 1 general layout. Corresponding parts in FIGS. 3 and 4 are provided with the same reference numerals as in FIG. 1. A cam disk 80 is mounted on the shaft of the drive motor 78 for the rotor 62. This cam disk controls a compression or shut-off body 82 movable in a vertical direction, forming the movable valve element of the squeeze valve 56. As can be seen from FIG. 3, the cam disk 80 is of substantially circular shape, the vacuum shut-off or squeeze valve 56 being closed when the compression body 82 is seated on the circumference of this circular portion of the cam disk 80. A cutout portion 84 permits an opening of the squeeze valve 56, (i.e., direct communication of the hoses 48 to 54 with vacuum system 26, 58) when the compression body 82 drops into this cutout portion 84.

Figure 5:
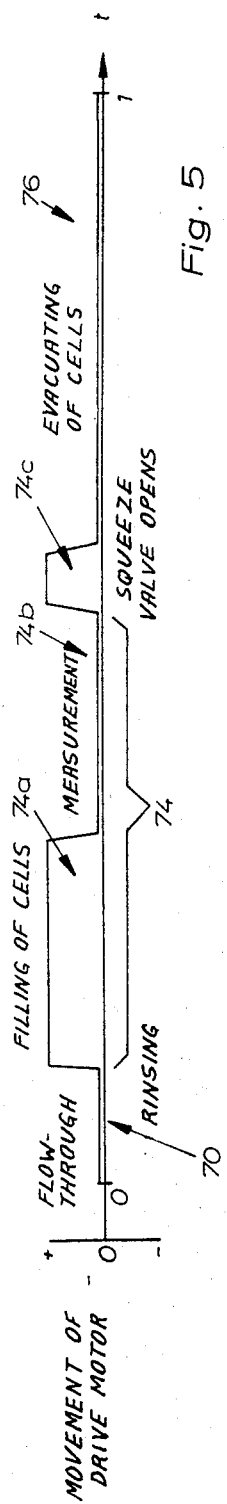
FIG. 5 is a diagram illustrating the control of the drive motor in the arrangement according to FIG. 3 and FIG. 4.
Figure 6:
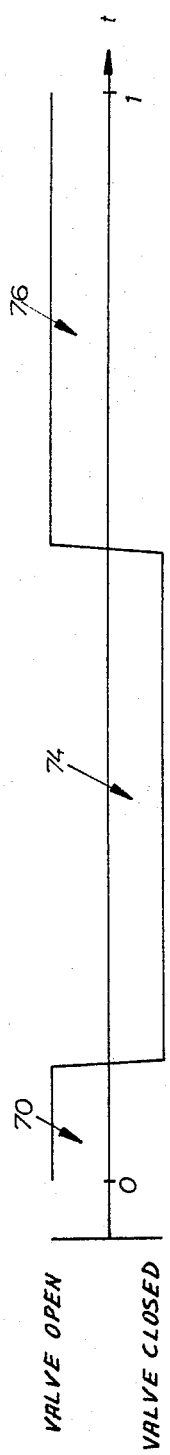
FIG. 6 is a similar diagram illustrating the position of the cut-off valve in the vacuum line, in dependence on time.

The diagrams of FIGS. 5 and 6 illustrate the switch-on (i.e., moving) and switch-off (stationary) periods of the drive motor 78 and the position or condition (i.e., open or closed) of the shut-off or squeeze valve 56, respectively. Initially, during the period 70, the rotor 62 and the cam disk 80 are in such a position that the compression body 56 drops into the cutout portion 84 of the cam, and the hoses 48 to 54 are directly connected to the vacuum system. Then, the rinsing action takes place as a proportion of the sample liquid is sucked through the system 30, 18 to 24, 48 to 54 by the vacuum (the sample removal pipes 32 being only partially immersed in the sample vessels 10-16). Then, the motor rotates in the direction of the arrow 68 (FIG. 3), the compression body 82 of the shut-off valve 56 being raised by the cam disk 80 on its circular rim and squeezing off (i.e., closing) the hoses 48 to 54. Now, during the time interval 74a, the cells are filled at low velocity of flow by the gradual suction of the hose pump 46 (sample removal pipes 32 being moved to the bottom of vessels 10-16). Then the motor 78 is stopped during the period 74b when the sample measurement is effected (e.g., by a photometric-type analysis). After termination of the measurement, the motor 78 executes a further small rotation during the time interval 74c, whereupon the compression body 82 of valve 56 again drops into the cutout portion 84 and the hoses 48 to 54 are released. Then follows the period 76 during which all of the remaining sample liquid from sample vessels 10 to 16 and cells 18 to 24 is sucked into the waste bottle 26 by the vacuum provided by pump 58.

The entire process will eventually be repeated with sample from new sample vessels, including rinsing of the (say, photometric) sample cells 18-24 and their inlet lines 30 and connections 28: by the new sample (during period 70 in FIGS. 5 and 6) prior to the refilling of the cells with this new sample at 74a and its measurement 74b, as just explained. The "new" sample will then be completely removed by the vacuum connection during period 76, and the entire cycle (with once again new samples) repeated once again. Thus, the device of FIG. 1 (incorporating, say, the specific positive displacement hose pump and vacuum shut-off valve of FIGS. 3 and 4) will operate according to the timing diagrams of FIG. 5 and FIG. 6 (which is essentially FIG. 2 repeated for convenience) to ensure that each of the to-be-measured samples introduced into the cells 18-24 is not contaminated to any appreciable extent by prior samples, regardless of the relative viscosities (and related flow characteristics) of all the sample liquids, both presently being tested and those previously introduced into the same sample cells (18-24).

The embodiment of FIG. 7 provides similar practical advantages, but avoids the need for a separate shut-off valve (like 56 in FIG. 1) as well as elimination of one of the sets of outlet lines from the sample cells (18-24 in FIG. 1). To avoid redundancy and to simplify the showing, only a single sample cell 86 (corresponding to the cells 18-24 of FIG. 1) and a single original sample vessel 96 (corresponding to 10-16 in FIG. 1) are shown in FIG. 7, although a plurality of sample cells 86 and in general a larger plurality of original sample vessels 96 will be actually present in the analytical system in which the illustrated sampling apparatus will be used. In particular the exemplary shown (single) sample cell 86 has only two connections, namely, a first (inlet) connection 88 and a second (outlet) connection 90. The inlet connection 88 terminates at the upper part of the cell, while the second or outlet connection 90 terminates at the bottom of the cell 86. The inlet connection 88 is connected by a hose 92 to a suction pipe 94, immersed in original sample vessel 96. The second connection 90 of the cell 86 is connected to the hose pump 100 by means of conduct hose element 98. As in the embodiment according to FIGS. 3 and 4, the hose pump contains a hollow cylindrical body 102 extending through slightly less than 360°, and a rotor 104, but in this case the rotor carries a single compression body 106. The pump hose 108, connected to the hose element 98, is carried along the inner side of the cylindrical body 102. The outlet side the hose pump 100 (i.e., hose 108) is directly connected with a waste collection container 110. A vacuum is maintained in the waste container 110 by means of vacuum pump 112.

The hose pump (or, more particularly, its rotor 104) is driven by a drive motor (not shown) in a manner as illustrated in the time diagram of FIG. 8. In the initial position, the rotor 104 (or more particularly the compression body 106 carried thereby) is at position "a" (compare FIGS. 7 and 8). In this position, the passage through the hose 108 of the pump 100 to the waste bottle 110 is unobstructed. The suction pipe 94 is only partly immersed in the sample vessel 96 at this time. During a time interval 114 (FIG. 8) a flow of part of the sample causes a rinsing effect like that occurring during period 70 of FIGS. 5 and 6. Thereafter, the drive motor is switched on, and during the period 116 the rotor 104 rotates through the long obtuse angle $\alpha$ to position "b". *This movement causes sample liquid to be sucked from the sample vessel 96 at substantially constant, relatively low velocity by the hose pump through the cell 86 into the conduit hose element 98 which is of sufficient capacity to hold the entire sample cell volume. Since the embodiment according to FIG. 7 (in contrast to the embodiment according to FIG. 1), suction is effected by the hose pump through the connection 90 terminating at the bottom of the cell, the cell will not be filled, but instead the sample liquid is immediately sucked out of the cell again into hose 98. For this reason, during the next period 118 when the motor is driven in an opposite direction so as to rotate through the angle $\beta$ into the position "c", this return stroke of the hose pump causes the sample liquid to be returned to the cell 86 from the hose element 98 so that the cell is filled.* Then, during period 120, the (say, photometric) sample analysis or measurement is carried out. Thereafter, the motor is again run in the forward direction during the period 122 through the angle $\gamma$ so that the hose compressing element on the rotor again is returned to position "a". At this position "a" of the rotor 104 (as shown in FIG. 7), the passage to the waste bottle 110 is again opened and because of the vacuum in the waste bottle 110 the just tested sample liquid is sucked out of the sample vessel 96, sample cell 86 and hose lines 92, 98, 108.

When sample suction connection 94 is placed in a new sample vessel (which will be moved into the relative position of vessel 96 in FIG. 7 upon completion of the cycle just described), the entire cycle will be repeated. In particular, part of the new sample will first rinse connection 94, hose 92, sample cell 86 (including connections 88 and 90), and hoses 98 and 108 during a period corresponding to period 114 described above with the rotor 104 in the FIG. 7 position "a" and the sample vessel suction pipe 94 extending partially into the liquid sample in the sample vessel replacing vessel 96. The other steps or periods (116, 118, 120, 122) with the pipe 94 moved to the bottom of the next sample vessel (replacing vessel 96) will then be repeated, so as to cause further sample withdrawal, return to the (already raised) cell 86, (photometric) measurement of the sample in the cell, and finally complete evacuation of all the sample throughout the apparatus into the waste collection bottle 110. Thus, the FIG. 7 embodiment, operating in the manner schematically shown in FIG. 8 also will pre-rinse the sample cell with a portion of the liquid sample about to be analyzed, prior to putting in a further portion (which is therefore free of any substantial contamination by a prior sample) of the same sample. Further, this (FIG. 7) embodiment also places the actual to be tested sample in the cell (86) by a positive displacement (hose) pump so as to avoid any frothing of low viscosity sample liquids while still assuring the obtaining of substantially equal quantities of much higher viscosity sample liquids. Since this embodiment, as well as that of FIG. 1, utilizes a relatively high vacuum for emptying the lines after the sample has been measured, even highly viscous samples are substantially completely removed. This, combined with the pre-rinsing with new sample prior to the next measurement assures a minimum of contamination of a sample by any residue from a previously tested ore.

WHAT IS CLAIMED IS:

1. In an apparatus for transferring sample liquid from an original sample vessel into a sample cell and for subsequently sucking the sample liquid from said cell by means of a relatively large vacuum source of the type in which a first connecting hose from said sample vessel terminates as a first inlet connection in said sample cell, a second outlet connection from the bottom of said sample cell is connected by a second connecting hose to said vacuum source for ultimately emplying said cell, and a shut-off means is provided in said second outlet connecting hose, the improvement comprising:

a positive displacement pump means is connected to said cell which cell is generally closed, so as to cause a controlled transfer by suction of sample liquid from said original sample vessel to said sample cell, to thereby ensure relatively slow, bubble-free transfer of said sample liquid with said cell.

2. An apparatus as recited in claim 1, in which:
said positive displacement transfer pump means is connected to said sample cell by a third connection, terminating at an upper part of said sample cell.

3. An apparatus as recited in claim 1, in which:
said positive displacement transfer pump is in the form of a hose pump having hose-compressing means movable along a substantial distance while constricting said hose, thereby tending to move a fixed amount of liquid sample.

4. An apparatus as recited in claim 3, in which:
the output side of said positive displacement hose pump is connected to said vacuum source;
so that said hose pump is connected from said sample cell to said vacuum source in parallel with said second connecting hose, having said shut-off means.

5. An apparatus as recited in claim 4, in which:
said hose pump comprises a cylindrical housing along the interior surface of which is positioned a hose connected to said third sample cell connection, and a motor driven rotor having two mutually offset compression bodies for constricting respective parts of said hose against said cylindrical housing;
a cam disk rigidly mounted for rotation with said rotor;
a shut-off compression body operatively engaging the cam surface of said cam disk and positioned immediately adjacent said second connecting hose in such manner that a portion of said surface of said cam causes said shut-off body to pinch closed said second connecting hose;
whereby a single motor directly controls operation of both said transfer hose pump and opening and shutting-off of said parallel second connecting hose between said sample cell and said vacuum source.

6. An apparatus as recited in claim 3, in which:
the input side of said hose pump is connected to said second outlet connection from the bottom of said sample cell by means of a conduit hose element of sufficient internal volume to accommodate the contents of the entire sample cell, the output side of said hose pump being connected to said vacuum source;
forward stroke means for causing movement of said hose-depressing means of said hose pump through a relatively large suction stroke angle $\alpha$ so as to suck sample liquid from said sample vessel, through said sample cell and into said conduit hose element;
return stroke means for causing movement of said hose-depressing means of said pump in the opposite direction through a somewhat smaller return stroke angle $\beta$ to cause said sample liquid in said conduit hose element to refill said sample cell;
means for subsequently moving said hose-depressing means of said pump to a subsequent intermediate position, in which it releases the depression of the hose of said pump, so as to allow unobstructed communication of said sample cell with said vacuum source, whereby said liquid sample is completely sucked out of the sample cell and said conduit hose element into said relatively large vacuum source.

7. An apparatus as recited in claim 6, in which:
said hose pump comprises an almost complete cylindrical housing extending circumferentially slightly less than 360°;
the pump hose connected to said second cell connection through said conduit hose element being positioned along the internal surface of said almost complete cylindrical housing;
said rotor and its said compression means therefore comprising the said hose-compressing means, the relatively long forward suction stroke and somewhat shorter return stroke of which causes, firstly, said sucking of said sample liquid from said sample vessel through said sample cell and into said conduit hose element, and the somewhat shorter return stroke of which causes said sample liquid in said conduit hose element to refill said sample cell;

and the movement of said rotor-carried compression body to said intermediate position at which said almost complete cylindrical housing is incomplete releasing of said pump hose, so as to cause said unobstructed communication of said sample cell with said vacuum source, thereby sucking said liquid sample completely out of said sample cell, said conduit hose element and said pump hose into said relatively large vacuum source.

8. An apparatus as recited in claim 6, in which:

rinsing means, operating prior to said forward stroke means are provided; for initially rinsing said sample cell with a portion of the sample in said sample vessel;

said rinsing means comprising means for causing said pump hose-depressing means to move to said intermediate position when said suction pipe is only partially within said original sample vessel, so that said portion of said sample in said vessel is sucked into the unobstructedly corrected vacuum source through said first connecting hose, said sample cell, said second connecting hose, said conduit hose element, and said pump hose, thereby pre-rinsing all these elements with sample liquid before the actually to-be-tested portion of the sample is placed in said sample cell.

9. An apparatus as recited in claim 2, in which:

means are provided for opening said shut-off means in said second outlet connecting house prior to operation of said positive-displacement pump, while said suction pipe is partially immersed into said original sample vessel;

whereby a portion of said sample liquid is sucked into the unobstructedly connected vacuum source through said first connecting hose, said sample cell and said second connecting hose, thereby pre-rinsing these elements with sample liquid before the remaining portion of the same actually to-be-tested portion of the sample is pumped into said sample cell.

10. An apparatus as recited in claim 1, in which:

said relatively large vacuum source comprises a sealed waste collection bottle connected to a vacuum pump.

* * * * *